(12) United States Patent
Yao

(10) Patent No.: US 7,811,701 B2
(45) Date of Patent: Oct. 12, 2010

(54) BATTERY ASSEMBLY

(76) Inventor: Li-Ho Yao, 4F, No. 99, Tungan St., Taipei (TW)

( * ) Notice: Subject to any disclaimer, the term of this patent is extended or adjusted under 35 U.S.C. 154(b) by 967 days.

(21) Appl. No.: 11/108,789

(22) Filed: Apr. 19, 2005

(65) Prior Publication Data

US 2006/0177734 A1 Aug. 10, 2006

(30) Foreign Application Priority Data

Feb. 4, 2005 (TW) .............................. 94103584 A

(51) Int. Cl.
*H01M 2/02* (2006.01)
*H01M 2/04* (2006.01)
*H01M 2/24* (2006.01)

(52) U.S. Cl. .................................................. 429/160
(58) Field of Classification Search ................ 429/160, 429/175, 176, 158
See application file for complete search history.

(56) References Cited

U.S. PATENT DOCUMENTS

| | | | |
|---|---|---|---|
| 2,980,751 A * | 4/1961 | Toce et al. | 429/120 |
| 4,107,402 A * | 8/1978 | Dougherty et al. | 429/120 |
| 4,513,167 A | 4/1985 | Brandstetter | |
| 4,943,494 A | 7/1990 | Riley | |
| 5,418,083 A * | 5/1995 | Tamaki et al. | 429/53 |
| 5,633,097 A | 5/1997 | Miller | |
| 5,773,159 A * | 6/1998 | Beard | 429/7 |
| 5,985,480 A * | 11/1999 | Sato et al. | 429/65 |
| 6,255,015 B1 | 7/2001 | Corrigan et al. | |
| 6,465,986 B1 * | 10/2002 | Haba | 320/116 |
| 6,929,504 B2 * | 8/2005 | Ling et al. | 439/485 |
| 2003/0015992 A1 * | 1/2003 | Dubac et al. | 320/121 |
| 2003/0124419 A1 * | 7/2003 | Ito et al. | 429/158 |
| 2003/0175584 A1 | 9/2003 | Shrim et al. | |
| 2003/0190522 A1 | 10/2003 | Ogata | |
| 2004/0197642 A1 | 10/2004 | Sato | |
| 2005/0031945 A1 * | 2/2005 | Morita et al. | 429/158 |

FOREIGN PATENT DOCUMENTS

| | | |
|---|---|---|
| CN | 1290405 A | 4/2001 |
| JP | 10-021896 | 1/1998 |
| JP | 10-154503 | 6/1998 |
| JP | 10-308205 | 11/1998 |
| JP | 11-67184 | 3/1999 |
| JP | 11-273647 | 10/1999 |
| JP | 2004-95357 | 3/2004 |
| JP | 2004-311165 | 11/2004 |
| KR | 10-2004-0086796 | 10/2004 |
| TW | 296852 | 1/1997 |
| WO | WO 00/35030 | 6/2000 |

OTHER PUBLICATIONS

Linden "Handbook of Batteries" 2ND Ed., McGraw-Hill, Inc, 1995, pp. 4.10-4.11.*

* cited by examiner

*Primary Examiner*—Gregg Cantelmo
(74) *Attorney, Agent, or Firm*—Rosenberg, Klein & Lee

(57) ABSTRACT

A battery pack includes multiple power bus lines connecting a quantity of cell strings in parallel, wherein each cell string includes multiple cells connected in series. The battery pack further has multiple conductors providing electrical communication between the cell strings such that a cell in one cell string is connected in parallel with a cell in other battery strings.

19 Claims, 16 Drawing Sheets

BATTERY ASSEMBLY

BACKGROUND OF THE INVENTION

1. Field of the Invention

The invention relates to a battery assembly composed of multiple electrochemical cells networked in a configuration suitable for powering electric vehicles (EVs) or hybrid electric vehicles (HEVs). This configuration not only improves the reliability of the power source, but also increases the power and energy densities of the battery assembly.

2. Related Art

Battery-powered vehicles such as electric vehicles (EVs) or hybrid electric vehicles (HEVs) contain one or more batteries that are constructed from multiple electrochemical cells. For example, a conventional lead-acid battery made for vehicle applications contains six cells connected in series inside a housing to form a twelve-volt power source. In most cases, neither the voltage nor the energy content of a single battery will be sufficient to power passenger electric vehicles; therefore, a solution is to connect a quantity of such batteries in series to boost both the voltage and energy content. In essence, this battery assembly contains a single string of N cells connected in series. When each cell has a voltage of V volts and a capacity of C ampere-hours, the total energy of the assembly is calculated to be N×V×C (N times V times C) watt-hours.

Although simple in concept, this design suffers from poor reliability and flexibility. For example, a practical battery assembly of 300 volts and 25,000 watt-hours is made by connecting in series twenty-five lead-acid batteries, each containing 1,000 watt-hours of energy. Since each of the twelve-volt batteries contains six cells in series, this assembly has one hundred fifty cells connected in a single string. If any of the cells or cell connections fails, the whole assembly fails, which presents a significant reliability challenge. Additionally, lead-acid batteries are very bulky. Electric vehicles usually have limited space set aside for their battery assemblies. The volume of a 1,000 watt-hour battery is nearly ten liters. Sparing two hundred fifty liters of volume for the 25,000 watt-hours necessary to run an electric vehicle's power source will not leave much flexibility for EV design.

On top of the above-mentioned issues, lead-acid batteries are inordinately heavy. In order to achieve a desired driving range, a battery assembly as heavy as half of the vehicle weight is often required. For example, in the scenario presented above, the weight of the battery assembly would be 750 kilograms excluding connectors and housing.

In recent years, new cell chemistries with better specific energy densities than lead-acid chemistry have emerged. For example, nickel metal hydride cells can deliver 50 to 70 watt-hours/kilogram, a significant improvement over 30 to 40 watt-hours/kilogram that lead-acid cells can deliver. Lithium-ion cells can deliver 100 watt-hours/kilogram or higher. These new chemistries have already been successfully commercialized in low-energy and low-power applications such as notebook computers and mobile phones. But, EV or HEV applications where high-power and high-energy are required are still in experimental stages. In addition to cost and safety concerns, the lack of a battery design that can efficiently harness the cell's power and energy is the primary reason for the slow commercialization.

In essence, a battery assembly can be structured by connecting cells in series or in parallel or a combination of both. The larger the amount of energy contained in each individual cell, the fewer the cells needed to construct the battery. The fewer the cells needed to construct the battery, the fewer parts needed for connecting the cells which will serve to reduce the weight of the finished assembly. Therefore, the larger the amount of energy contained in each individual cell, the lower the weight of the final assembly. The weight reduction is particularly obvious when high power output is required; heavy connectors must be used in order to minimize the power loss due to added resistance introduced by them. For EV applications, a battery power output of 150,000 w or higher is not unusual. For comparison purposes, a typical notebook computer battery has a maximum power of less than 200 w. Even at this low level of power, the notebook computer battery's assembly can overheat if not properly designed. Hence careful engineering of connectors in EV battery is crucial to its success.

As the power and energy content of a cell increase, safety concerns increase as well. In extreme situations, a battery can cause a fire or explosions that may spread throughout the entire pack to create a major safety incident. Such is the case for lithium-ion cells. Although they have the advantages of high specific energy and power densities, the application to EV or HEV still lags behind nickel metal hydride cells due to safety matters.

It is well known that safety concerns for lithium-ion cells become less of a concern when the size of the cells is reduced. But, the conventional thinking argues that building large battery assemblies from small cells would inevitably be ineffective due to a large number of connector required, which will result in both reduced specific energy and reliability. With reference to FIG. 11, a generic battery connects P cell strings (62) in parallel between two current collectors (63)(64) where each cell string (62) includes S cells (61) connected in series. It is desirable for the current collectors (63)(64), which carry the battery current to external loads, to be large conductors in order to be less resistive. However, the connectors (65) for the series string do not need to be as large as current collectors (63)(64) because on average the current flow in individual cell strings is 1/P (one over P) of that flowing in the current collectors (63)(64). As a result, this assembly is shown to be efficient in terms of weight added by the connectors (65), particularly when cells (61) are small and S is a large quantity. However the reliability is an issue. As explained earlier, when one cell (61) fails, the entire string (62) fails, which reduces the energy by a factor by 1/P. The power density suffers because of this as well. When a second cell (61) in the assembly fails, the probability is higher for it to be located on a different cell string (62) than on the same string. The energy of the assembly would then be further reduced by a factor of 2/P.

When this design is applied to lithium-ion cells, the battery charge/discharge management system is complex. Lithium-ion cells perform the best when the charge and discharge are controlled within a voltage range. If the range is exceeded during use, the cells can suffer reduced life and capacity, or even become a safety hazard. In this assembly design described, S×P (S times P) cells need to be controlled individually, which would be a cumbersome task for large assemblies.

To simplify the battery management system, an alternative design as shown in FIGS. 12 and 13 connects P cells (71) in parallel with two current collectors (73) and then connects S parallel groups (72) in series. All P cells (71) connected within a parallel group (72) will be made to display the same voltages by their current collectors (73) and as a result, the management circuitry will need to control only S points as opposed to S×P points as in the first design. Unfortunately, with this design, each parallel group (72) will be required to gather its own current by heavy current collectors (73), which will make the assembly heavy.

Clearly, a design suitable for EV or HEV batteries that possesses a combination of high energy, high power, high reliability and high level of safety is lacking.

SUMMARY OF THE INVENTION

A battery assembly includes one or more batteries; wherein each battery containing S×P (S times P) cells has the structure of two current collectors connecting P cell strings in parallel. Each cell string is comprised of S cells connected in series. The battery is completed by connecting P cells in corresponding positions in each of the P strings with metallic connectors. These connectors are made in a centipede shape so that only S pieces of them will serve to make all the necessary connections in a S×P battery. The management circuitry of a battery assembly is simplified to a level that it is realistic for the assembly to be made from small cells to improve on safety. The energy density, power density and reliability are also improved. The net result is a battery assembly that is simple to produce and suitable for high power applications such as EV or HEV.

Further features and details of the present invention will be described as follows.

DETAILED DESCRIPTION OF THE PREFERRED EMBODIMENT

Figure 1:
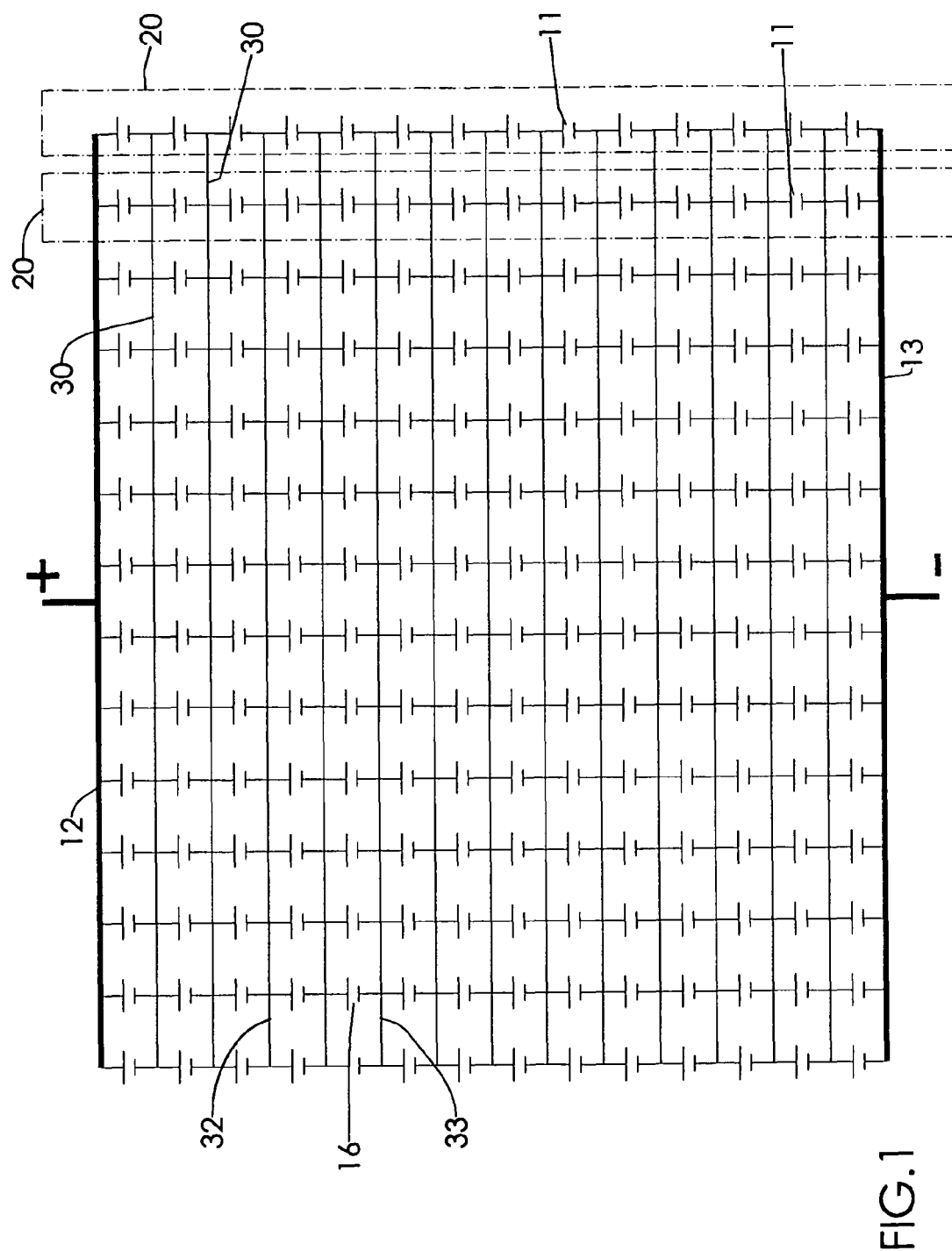
FIG. 1 is a schematic diagram of a battery of the invention.

With reference to FIG. 1, a battery in accordance with the present invention employs a configuration that networks S×P electrochemical cells (11) together by connecting each cell (11) both in series and in parallel to the neighboring cells (11) in such a manner that the voltage of the battery will be S×V (S times V), where V is the voltage of the cells. The connections are made by metallic conductors to reduce the electric resistance. Two current collectors (12)(13) serve to carry the current, I, to the external loads of the battery. The connectors (30) that are parallel to the current collectors (12)(13) are referred to as "equalizing lines" because they force P cells (11) between two adjacent lines to be at the same voltage. If the voltage of any cell (11) becomes different from the rest in this group during charge or discharge of a battery, the voltage difference will cause a current flow on the equalizing lines until the voltages are equalized. When all the cells (11) employed in the battery are equalized, very little current will flow in the equalizing lines and hence, on average, the current flow in each of the P serial strings (20) is I/P. Accordingly, current collectors (12)(13) should use heavy conductors and serial connectors should use approximately 1/P the size of the heavy conductors. The equalizing lines can be served by conductors much smaller than used in prior art batteries.

Figure 11:
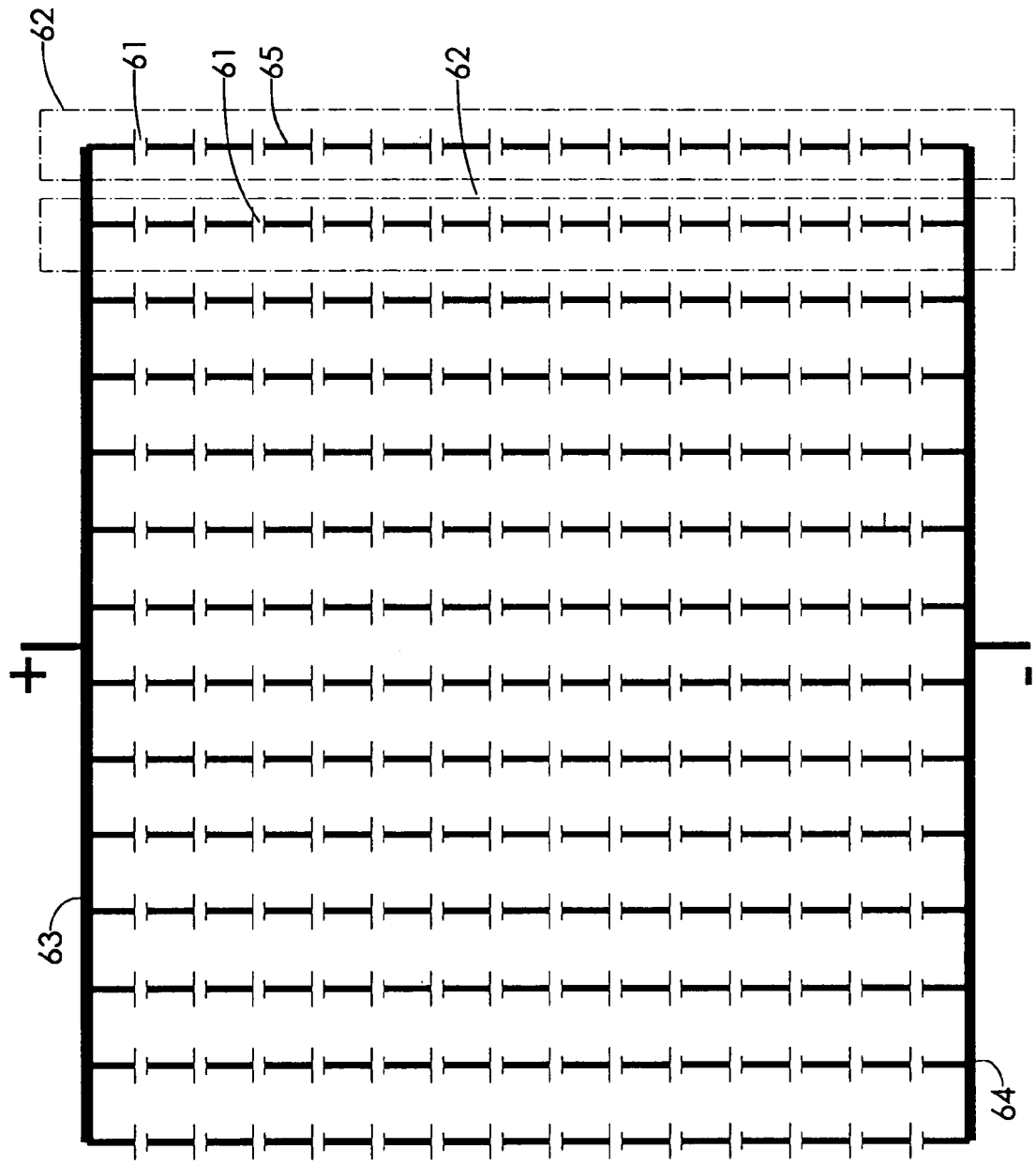
FIG. 11 is a schematic diagram of a conventional battery pack.
Figure 12:
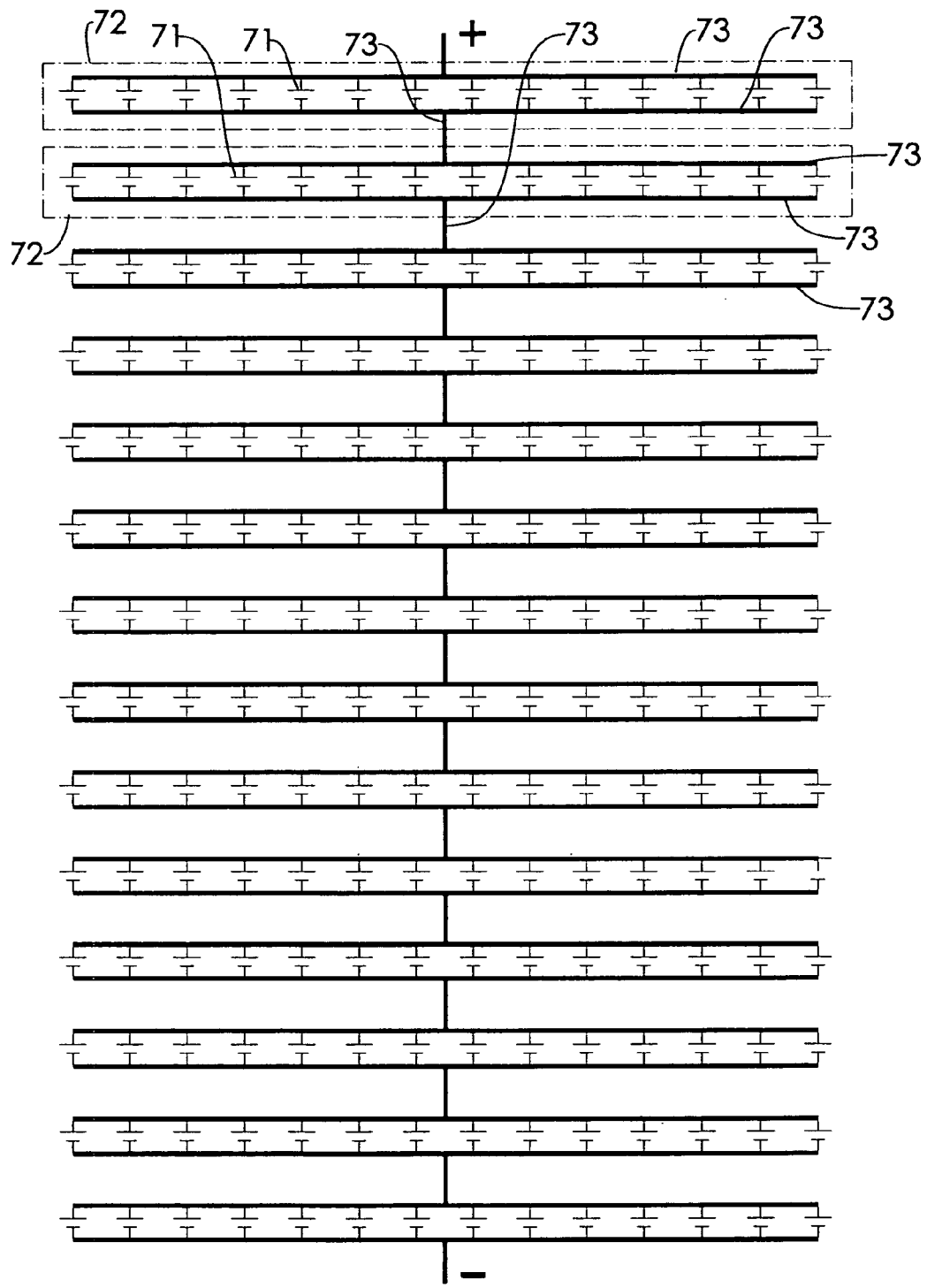
FIG. 12 is a schematic diagram of another conventional battery pack.
Figure 13:
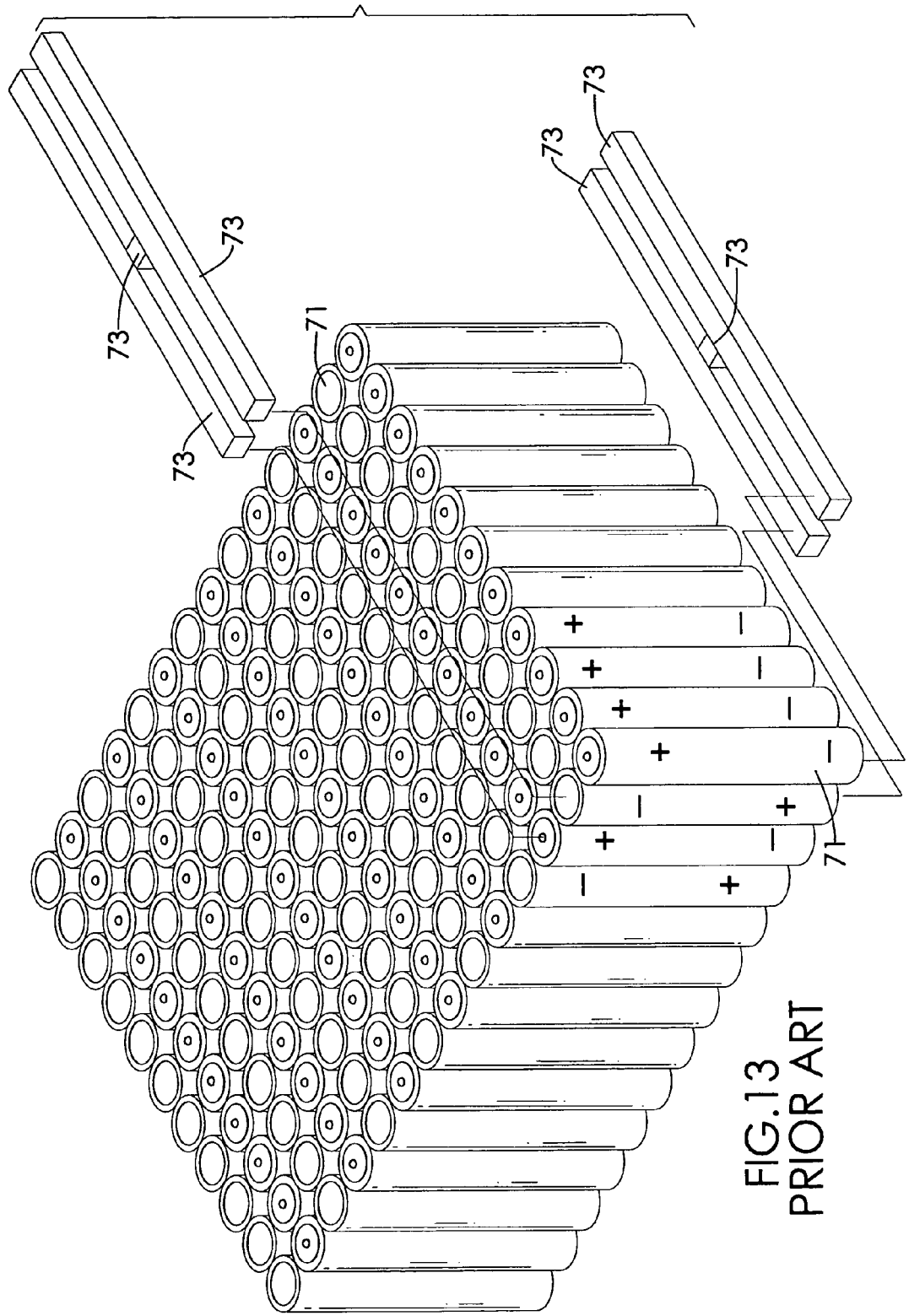
FIG. 13 illustrates an embodiment of a battery pack in accordance with FIG. 12.

However, in situations where there is a cell (16) failure, the current will bypass the failed cell (16) through equalizing lines (32) (33). This will require lines (32) (33) to have half the current carrying capability of that of serial connectors. Note that the energy content of this parallel group between lines (32) and (33) is reduced by 1/P. During the discharge of a battery, whenever any parallel group's energy is used up, the entire assembly must stop in order not to damage that particular group. As a result, the energy content of the battery is reduced by 1/P as well. When a second cell failure occurs, the probability for the failure to be located in the same group versus other groups is (P−1)/(S×P−1), is quite a low probability when S is a large quantity. When two or more cells fail in different parallel groups, the energy content is still reduced by 1/P only. Effectively, the reliability of this assembly becomes higher than that shown in FIG. 11. This effect becomes more obvious when S is larger than four.

In the case of a lithium-ion battery, since the safety concerns dictate preferable use of small cells, P must be large to comprise the necessary energy content. When P is sufficiently large, an effective way to improve battery reliability is to design with S×(P+1) network instead of S×P. Although this extra serial string increases the battery size by (P+1)/P, it will assure that the battery has a high probability of delivering the designed energy of P×S×V×C even when there are multiple cell failures. In a 5×5 configuration, a 20% increase in battery size will allow it to have an 83% chance to withstand two cell failures. Combined with the earlier argument for reliability, the benefit of the present invention becomes obvious when both P and S are larger than 4; the larger both P and S are, the better The power output behaves differently when a failure occurs. The same amount of current can be drawn from the parallel group but at a lower voltage because the current shared by each of the remaining cells is higher by a factor of 1/P. Since power is calculated by multiplying the current with the voltage on load, it is lowered by the depressed voltage, but not necessarily by a factor of 1/P. The discharge voltage profile of a lithium-ion cell is S-shaped with a relatively flat zone from 20% to 80% depth of discharge. In this zone, the load voltages change very little with increased current in low to medium power drain situations. Hence the percent power loss due to cell failure is smaller than that of energy loss.

Figure 14:
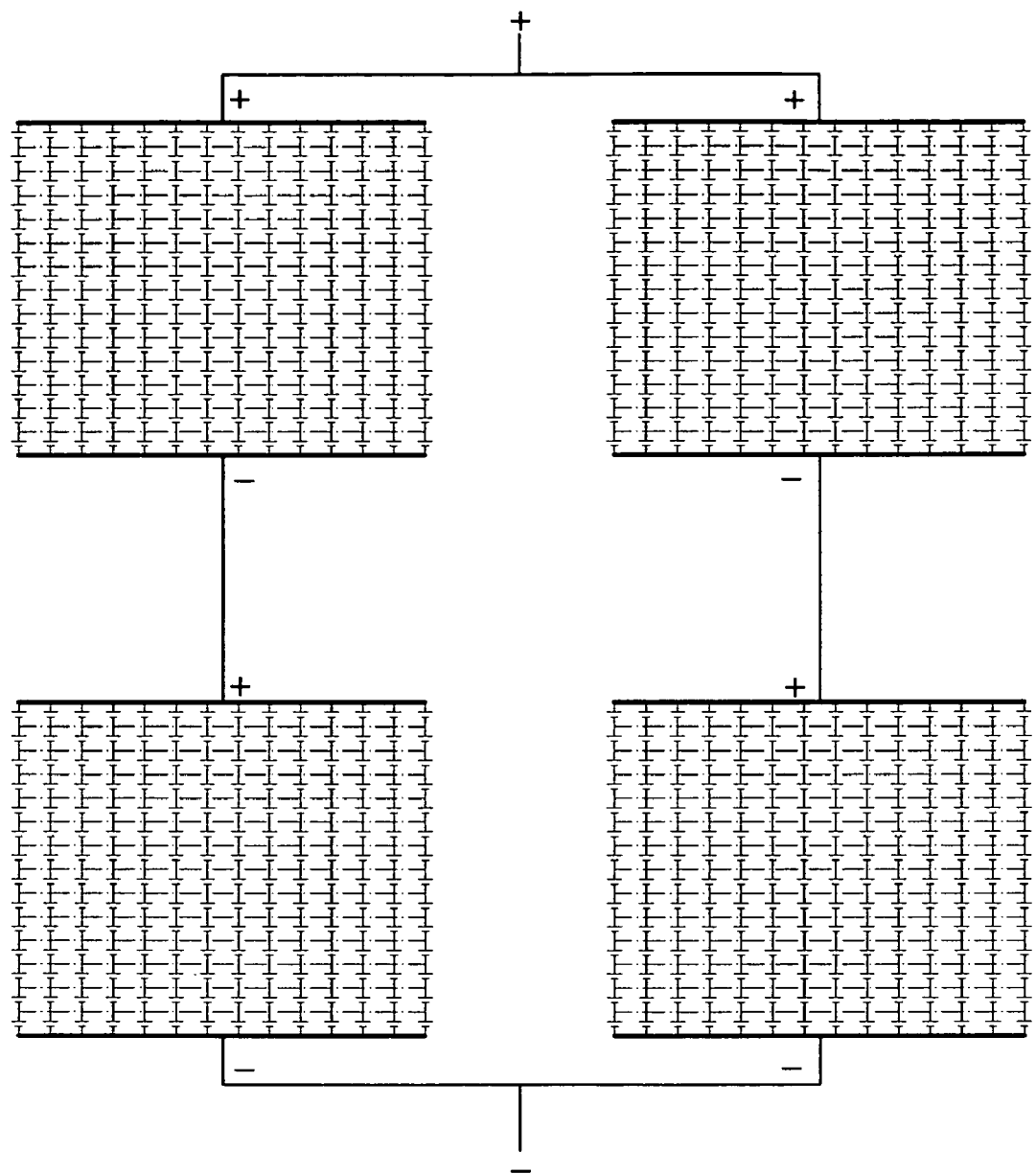
FIGS. 14-16 illustrate different embodiments of the present invention that the battery assembly is separated into several compartments.
Figure 15:
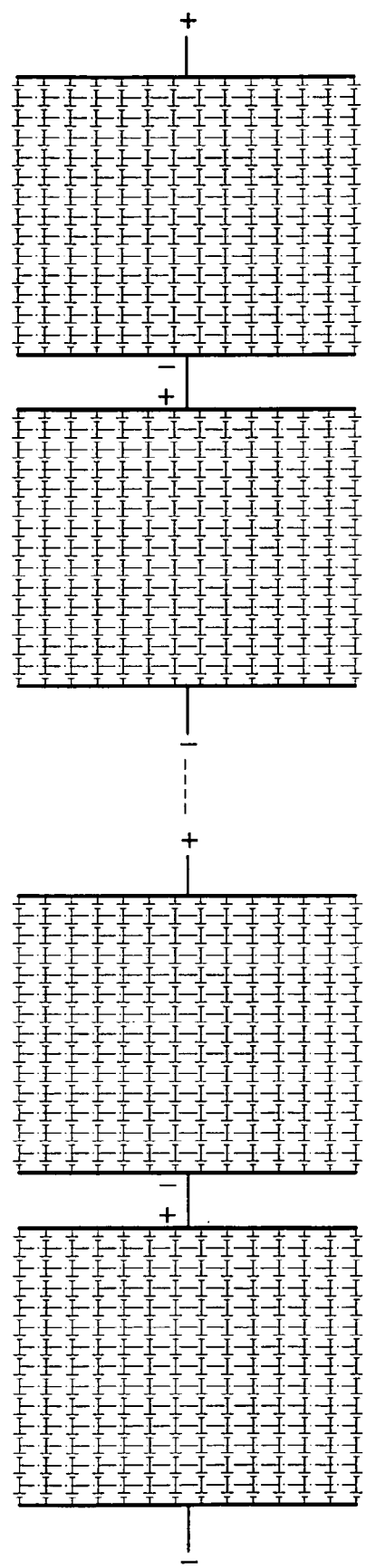
Figure 16:
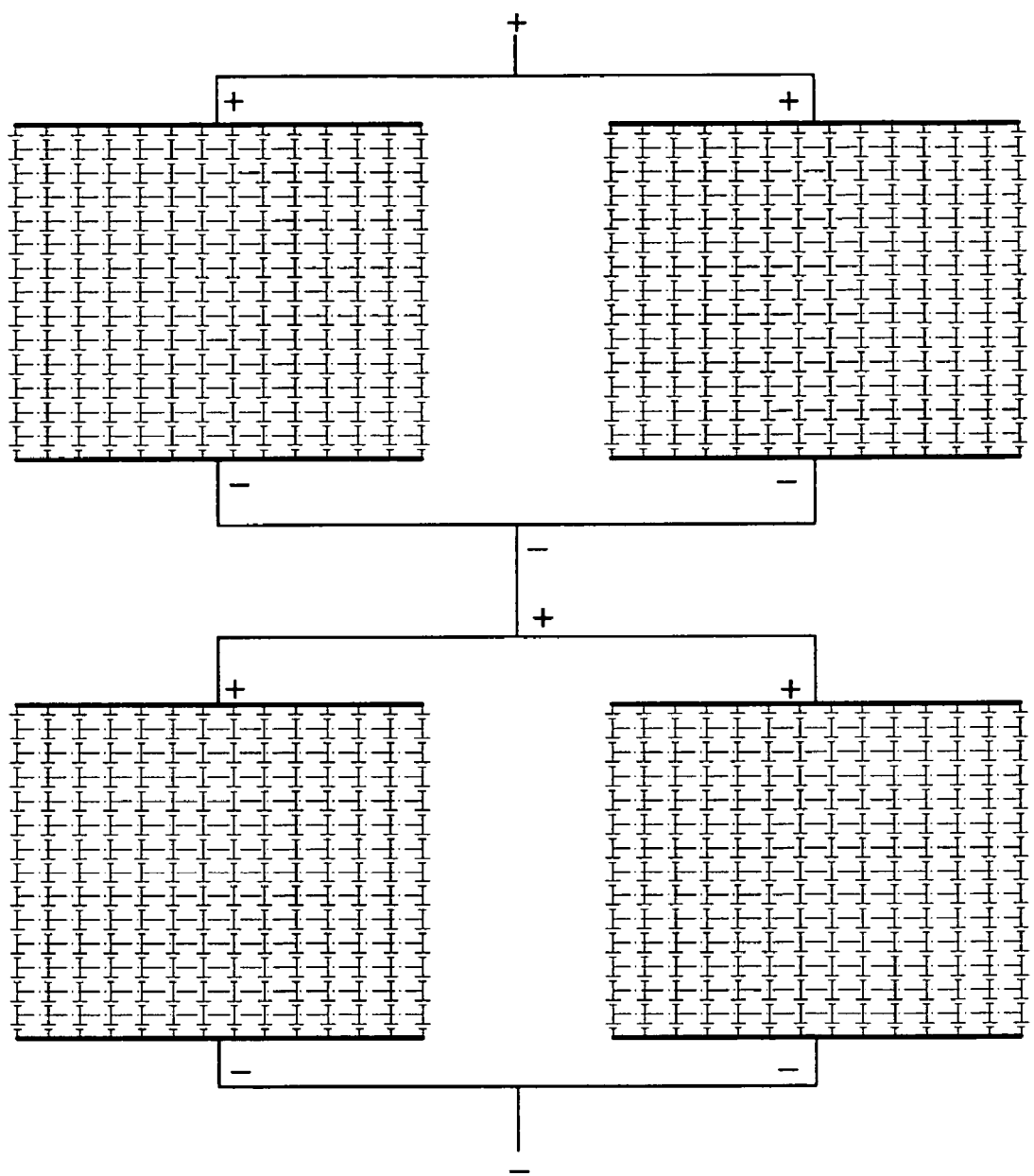

A quantity of these batteries can be connected in series or in parallel or in a combination of both to make a battery assembly for EV or HEV applications. For example, an EV power source that requires 370V is designed by connecting 100×P lithium ion cells where each cell is 3.7V. But, the space limitation and weight balance dictate that the battery assembly be separated into several compartments. FIGS. 14-16 illustrate different examples where the assembly is connected together.

For a typical passenger EV, the desired energy content is 20,000 watt-hours or more in order to have reasonable driving range, which suggests 200 watt-hours or more is required for each of the parallel groups in the above example. The selection of cell size is as much a safety consideration as it is a cost consideration. The safety of a lithium ion cell is largely determined by its thermal behavior, and is complex and empirical in nature. Based on experience with commercial cylindrical lithium cells, when the radius is smaller than 3.5 cm, the thermal factors are more manageable and thus are safer. This is evident because nearly all lithium cells available in the consumer market have radii under 3.5 cm. However, as cells are made smaller beyond a certain size, the cost becomes higher. For this consideration, the radius needs to be larger than 0.5 cm. Commercial lithium ion cells, e.g., 18650 (1.8 cm diameter and 6.5 cm height) or 26700 (2.6 cm diameter and 7.0 cm height) of energy content ranging from 5 to 15 watt-hours, are balanced choices. Take an 18650 cell for example, P needs to be 40 if each cell is 5 watt-hours.

Figure 2:
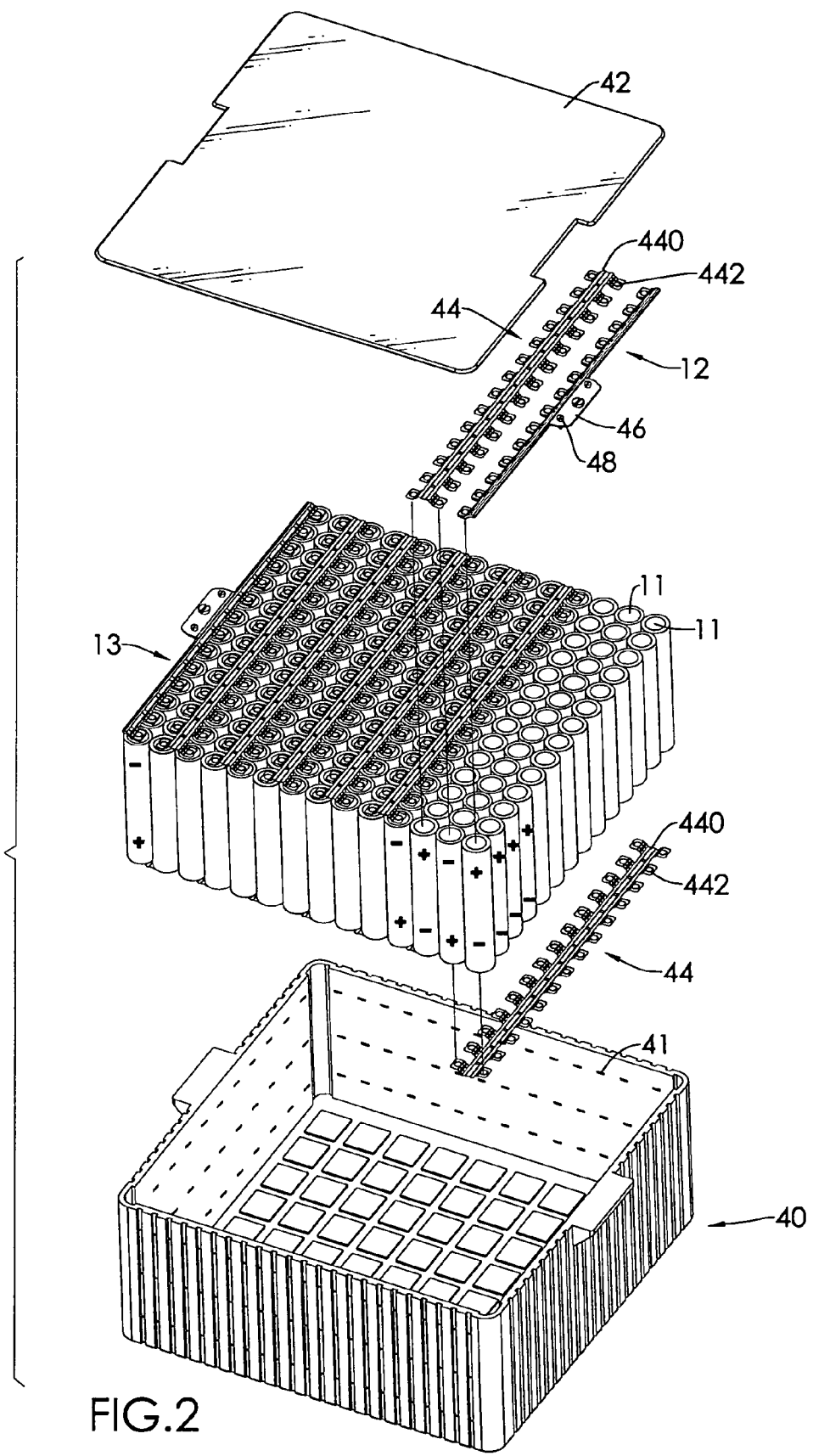
FIG. 2 illustrates an exploded perspective view showing an embodiment of the battery of FIG. 1 being held in a case.

With reference to FIG. 2, the battery of the present invention can be held inside a case (40), with a cover (42) attached to the case (40). As shown in the drawing, two metal pieces serve as the current collectors (12)(13). Each metal piece is formed with multiple tabs extending from one side of a plate body, with each tab on the conductive sheet electrically contacting a terminal of an outermost cell (11) of the battery.

Each of the cells (11) has one terminal at one end and another terminal at the opposite end. These terminals can be connected by multiple conductive plates (44) to form the network configuration shown in FIG. 1. In the embodiment conductive plates (44) serve as the series connectors as well as the equalizing lines mentioned above. The structure of the conductive plates (44) and the electrical connection to the cells (11) will be described later in detail.

Figure 3:
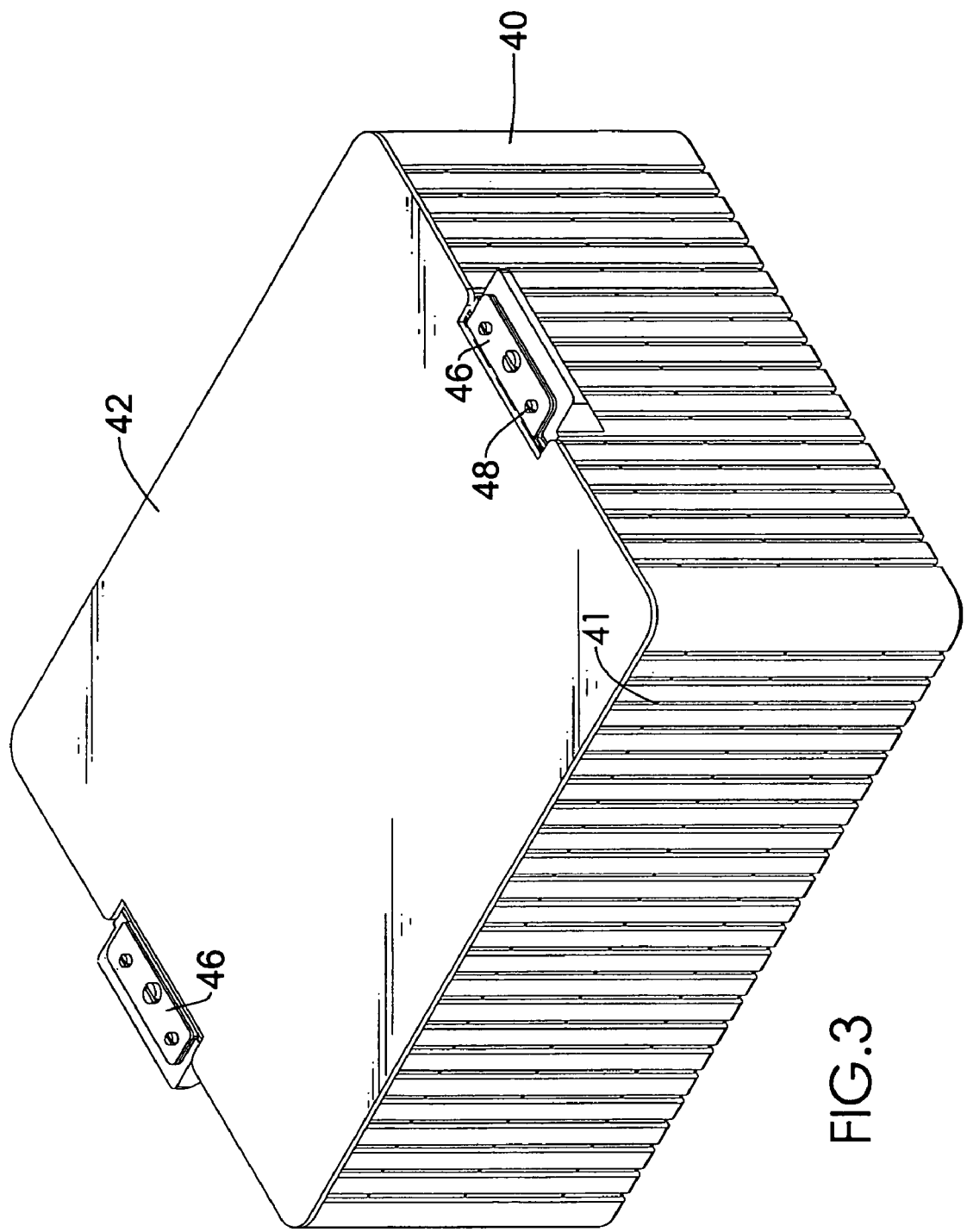
FIG. 3 is a perspective view of the battery pack being held in the case.

With reference to FIG. 3, the case (40) can further include a quantity of holes (41) in its walls (40). Each hole (41) is preferably formed as an inclined shape with two openings, where the inner opening is higher than the outer opening. These through holes (41) will allow heat generated by the battery pack be dissipated, while also preventing exterior water penetrating the casing.

Figure 4:
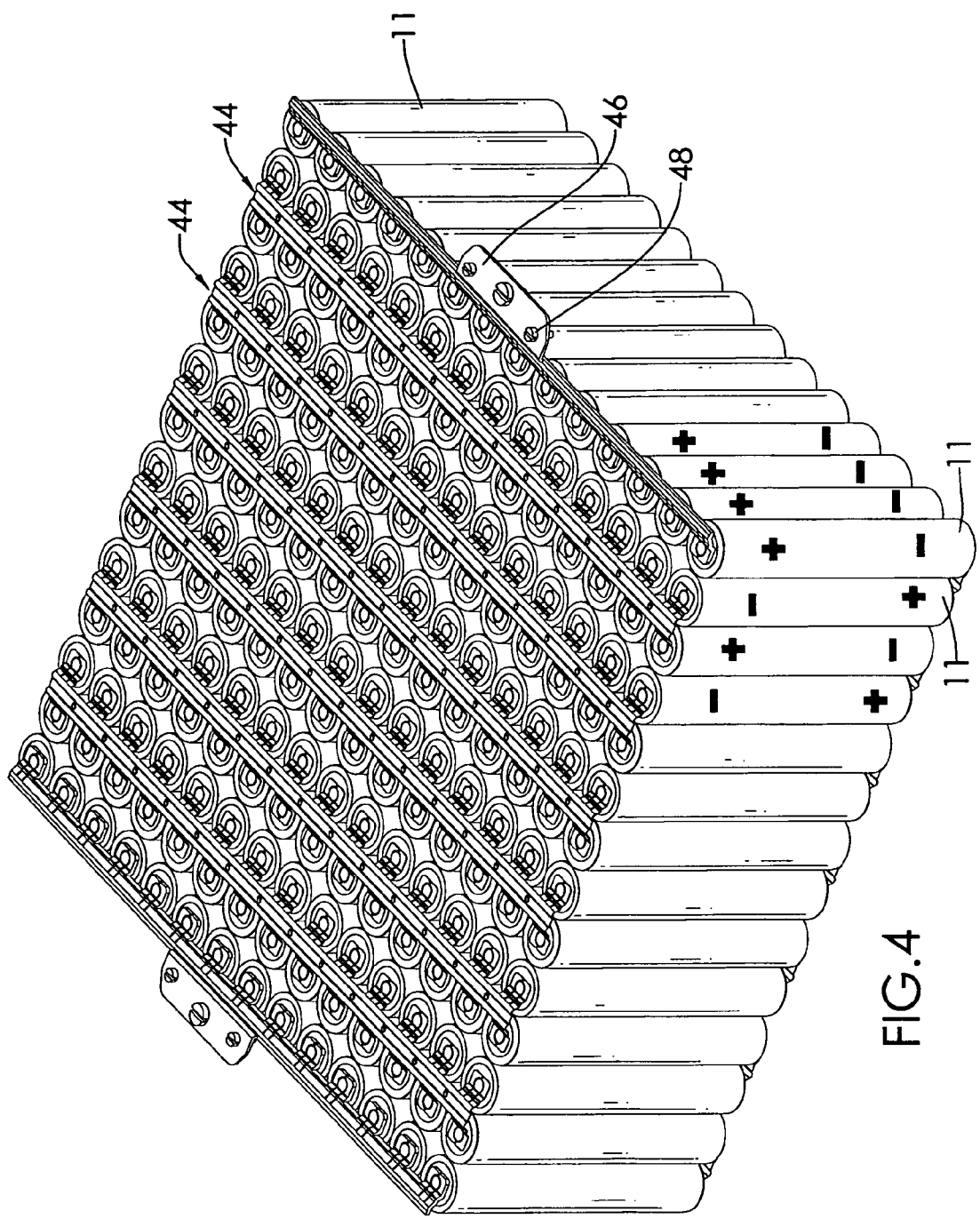
FIG. 4 illustrates a battery with electrical connections in accordance with FIG. 1.
Figure 5:
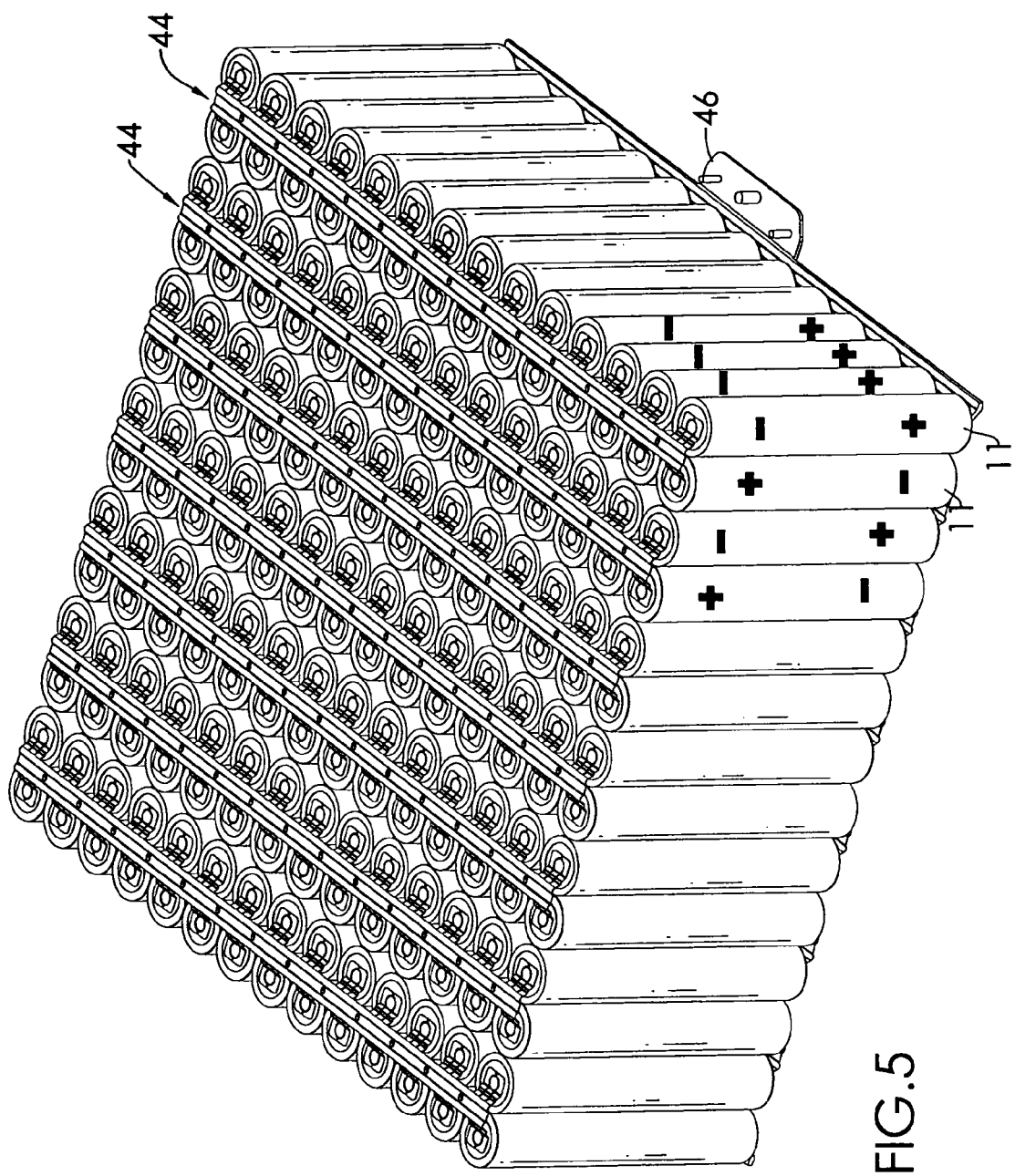
FIG. 5 illustrates a perspective view of the underside of the battery pack shown in FIG. 4.
Figure 6:
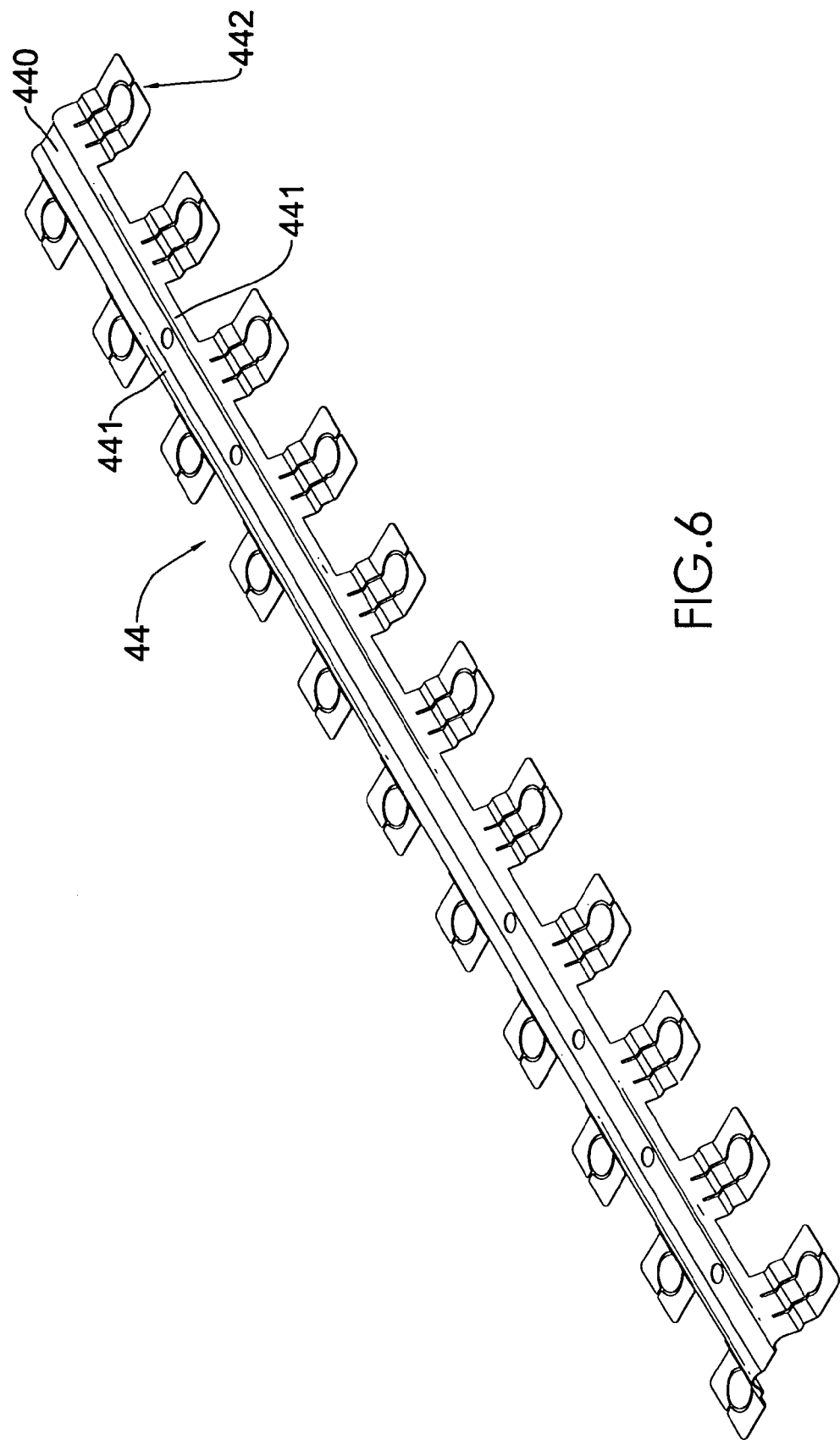
FIG. 6 illustrates a perspective view of a connector.
Figure 7:
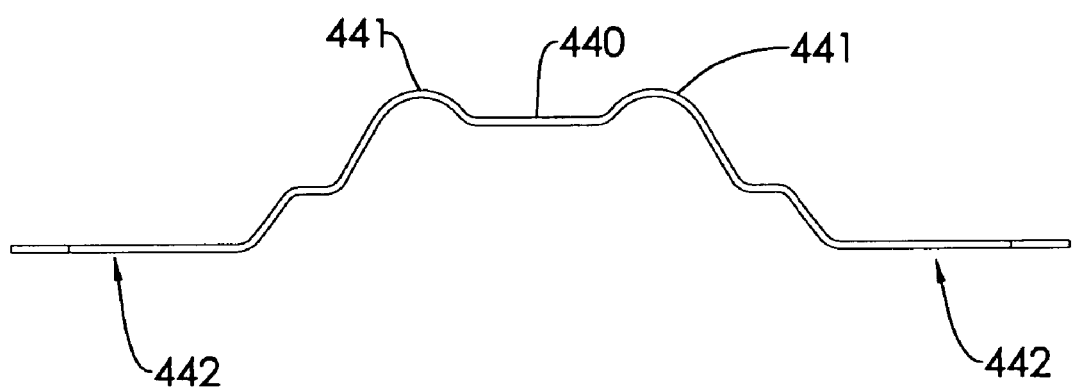
FIG. 7 illustrates a side plan view of the connector of FIG. 6.

With reference to FIGS. 4 to 6, each of the centipede-shaped conductive plates (44) includes multiple tabs (442) connecting to a longitudinal body (440). In the embodiment, the tabs (442) are symmetrically extended from opposite sides of the longitudinal body (440). With reference to FIG. 7, the conductive plate (44) has a stepped arch that extends from a tab (442) on one side of the body (440) to a tab (442) on the other side. The body (440) has a top surface on which there are protruding ribs (441). The arch shape permits the conductive plate (44) to absorb vertical pressure experienced by the battery without disruption because the body (440) absorbs the stress. Suitable materials for the conductive plates (44) include, but are not limited to, a metal plate with nickel surfaces, or a clad (a copper plate with nickel surfaces). The use of nickel can offer advantages of high corrosion resistance, high conductivity and low cost.

An alternative embodiment of the conductive plate (44) includes multiple tabs (442) integrally extending from only one side of the body (440). Another alternative embodiment of the conductive plate (44) has multiple asymmetrical tabs (442) integrally extending from opposite sides of the body (440). Another suitable method of constructing the conductive plate (44) connects the tabs (442) to the body (440).

Each tab (442) is formed as a rectangular piece defined with a U-shaped slot and a notch communicating the slot, thus separating the piece into three contacts. These contacts can be individually welded onto a terminal of the battery (11) to increase reliability. When the battery experiences horizontal movements, the left and the right contacts are able to absorb the stress so that the middle U-shaped contact can still be securely mounted on the battery.

Each metal piece (12*a*)(13*a*) has a platform (46) with terminals (48) mounted thereon. The terminals (48) can be constructed from a metal structure and attached on the platform (46) by any known fastening technique. In this embodiment, the platform (46) as well as terminals (48) extends through the case (40) to permit access from the outside of the case for load connections.

Figure 8:
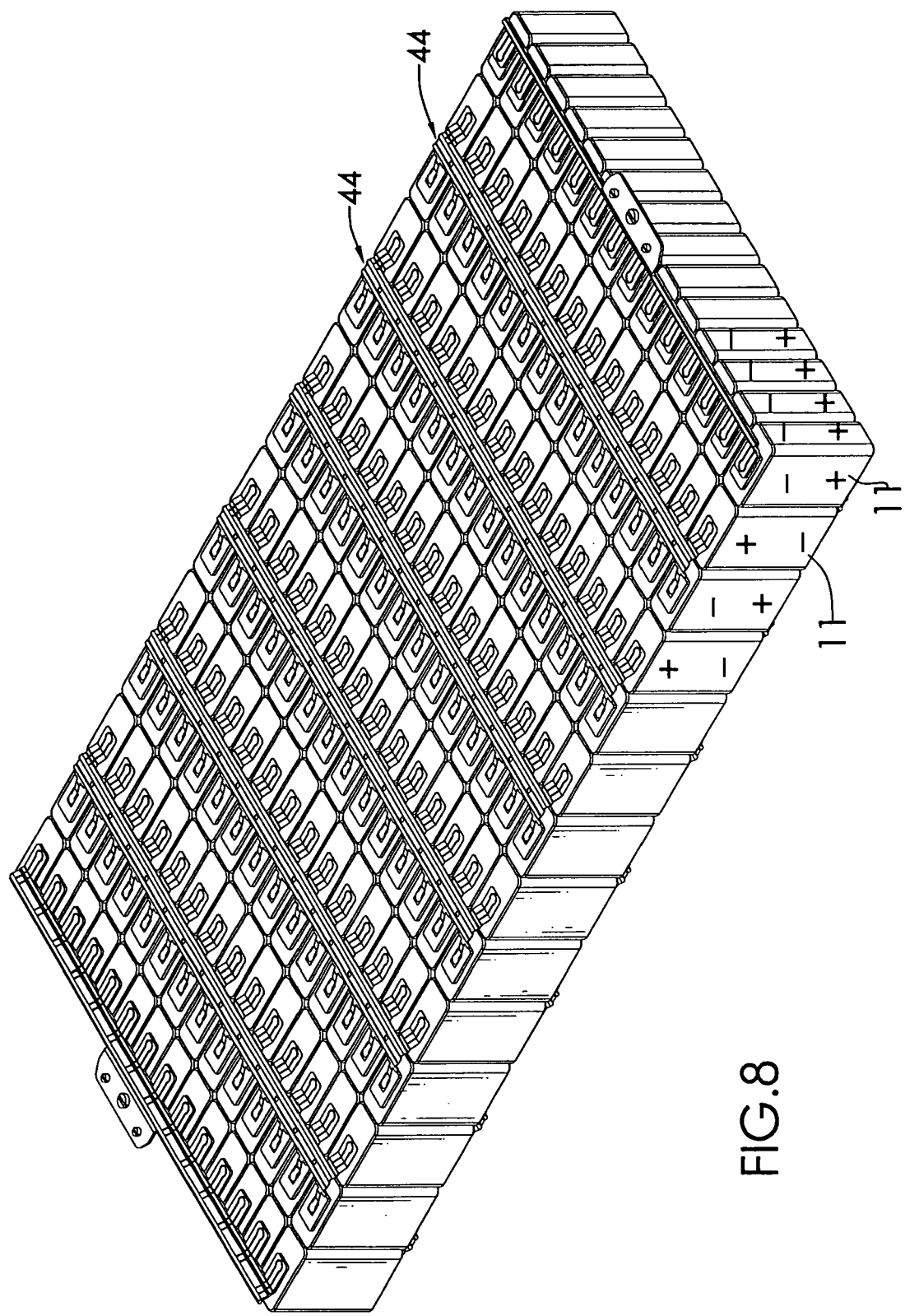
FIG. 8 illustrates another battery pack that has electrical connections in accordance with FIG. 1.
Figure 9:
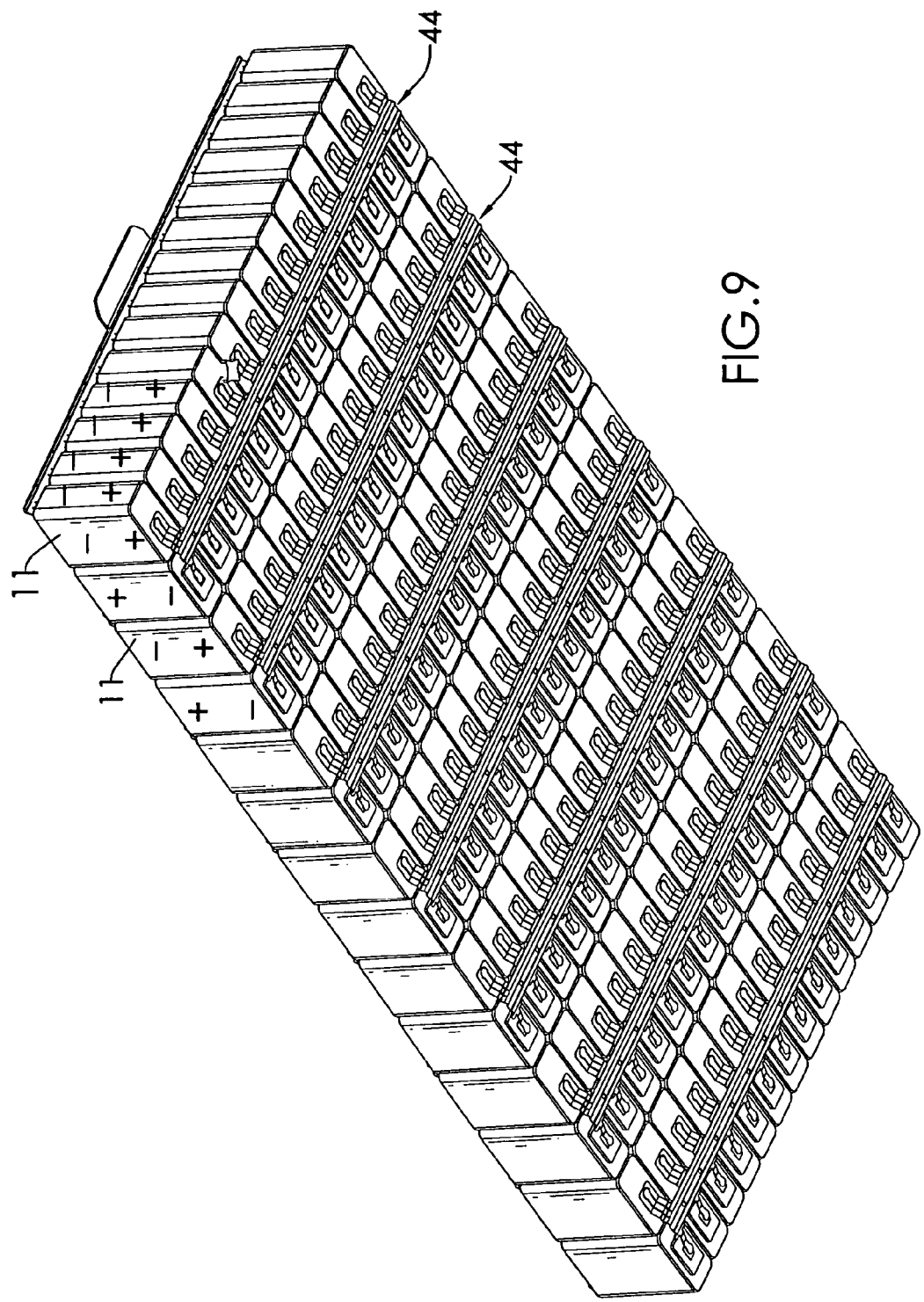
FIG. 9 illustrates the bottom of the battery pack of FIG. 8.

An alternative embodiment of the cells is illustrated in FIGS. 8 and 9. The rectangular cells can be either lithium-ion or nickel metal hydride. It is noted that the polarity of such rectangular cells is different from the cylindrical types. An end with a protrusion represents a terminal, and the other flat end represents the opposite terminal. The rectangular cells are also suitable for connection into the grid configuration as shown in FIG. 1 by the conductive plates (44).

Figure 10:
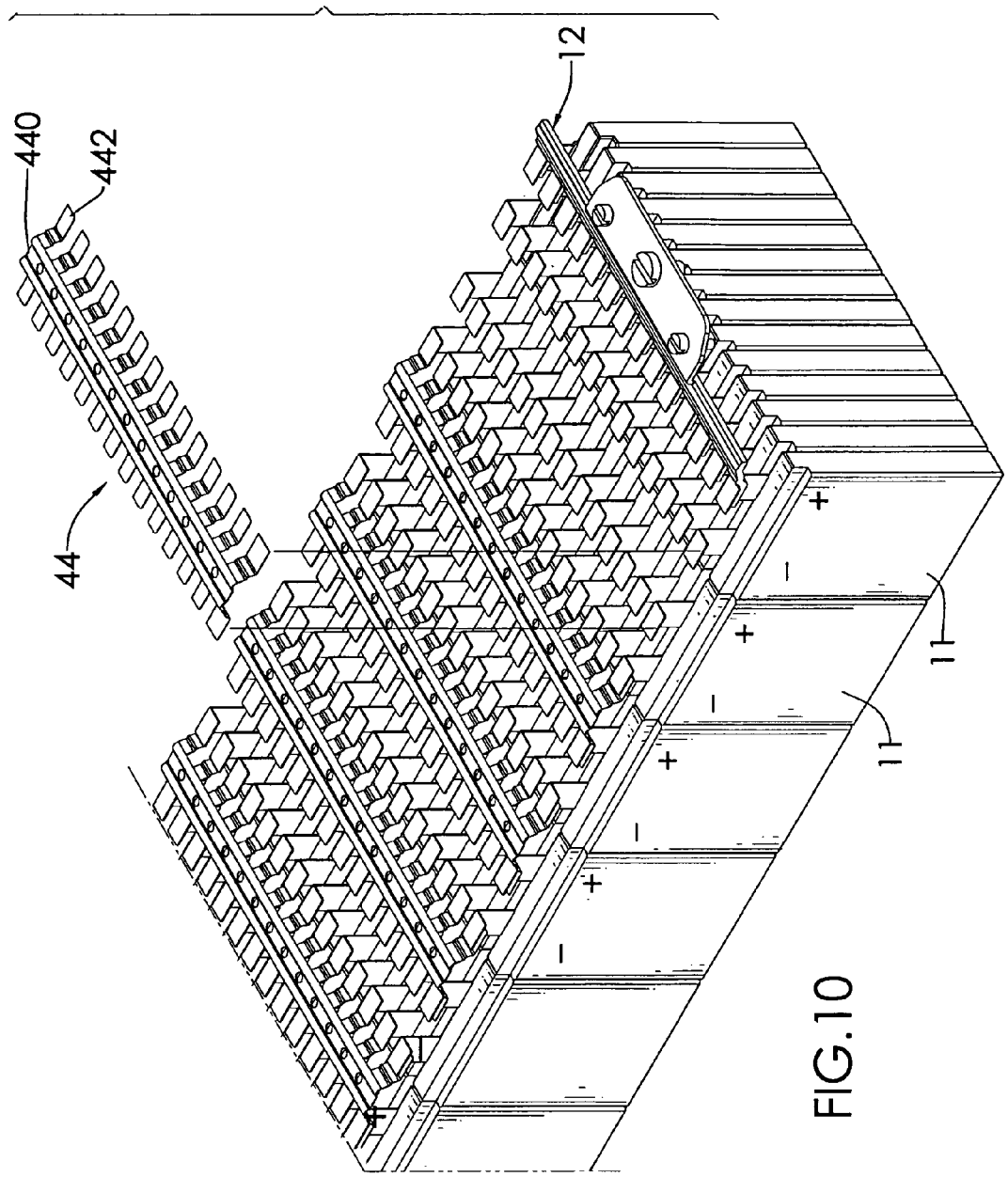
FIG. 10 illustrates another embodiment of a battery pack with electrical connections in accordance with FIG. 1.

With reference to FIG. 10, another type of rectangular cell extends a positive terminal and a negative terminal from the same end. A lithium polymer cell or the advance lithium ion cell (laminated lithium ion cell) has such a structure. The positive and the negative terminals of the cells are alternately arranged and then electrically connected by the conductive plates (44).

EXAMPLE 1

A battery of 50×20 configuration and 185V is made by connecting 1,000 lithium-ion cells, each having 3.0 ampere-hour capacity, 100.1 g weight, 2.7 cm diameter and 7.0 cm height, with pure nickel conductive plates stamped out of 10-micron thick nickel sheets as described in this invention. The DC resistance of the cells measured at 50% depth of discharge is 14.2 milliohms. Two pure copper pieces, 0.6 cm×0.35 cm×54 cm, serve as current collectors. The combined cell weight is 10,010 g grams and the battery weight is 10,153 grams; only 1.43% weight is added by the connectors. The discharge capacity, DC resistance and loaded voltage at 30 amperes and 50% depth of discharge are measured and listed in Table I. The power output of this battery is higher than 105,540 w.

|  | Cell | Battery, measured | Battery, predicted |
| --- | --- | --- | --- |
| Capacity | 3.0 Ah | 60 Ah | 60 Ah |
| DC resistance | 14.2 milliohm | 35.6 milliohm | 35.5 milliohm |
| Load Voltage, 10 C | 3.52 V | 175.9 V | 176.0 V |

EXAMPLE 2

A battery assembly is structured by connecting in series two of the batteries in example 1. The nominal voltage of the assembly is 370 volts and the power output is larger than 211,080 watts.

EXAMPLE 3

A battery is made as in example 1 but a failure is simulated by disconnecting a weld to cell 12. The discharge capacity at 60 amperes current and DC resistance at 50% depth of discharge are measured to be 57 ampere-hours and 35.7 milliohms. The load voltage at 10 C is 175.7 volts, a power loss of mere 0.2% at this rate. When a second failure is created by disconnecting a cell 13, the discharge capacity remains at 57 ampere-hours. The load voltage is 175.5 volts, a power loss of 0.4%.

However, the present invention is not limited to the above described configuration; the rights sought are defined by the following claims, within the scope of which many modifications can be envisaged.

What is claimed is:

1. A battery comprised of:
   current collectors connecting multiple cell strings in parallel, wherein each cell string comprises multiple cells connected in series; and
   multiple conductors electrically connected among the cell strings to form a network configuration such that a cell in one cell string is connected in parallel with a cell in other cell strings, and further equalizing voltages of the multiple cells when any cell becomes different from the rest of the cells;
   wherein each of the multiple conductors is a conductive plate formed by multiple tabs connected to a body, and each of the tabs is a flat piece having a U-shaped slot and a notch communicating with the slot defined therein, thus splitting the flat piece into three contacts.

2. The battery as claimed in claim 1, wherein the conductive plate is a nickel plate.

3. The battery as claimed in claim 1, wherein the conductive plate is a metal plate formed with nickel surfaces.

4. The battery as claimed in claim 1, wherein the conductive plate is a copper plate formed with nickel surfaces.

5. The battery as claimed in claim 1, wherein the multiple tabs are connected to one side of the body, and each of the tabs electrically connects to one of the cells.

6. The battery as claimed in claim 1, wherein the multiple tabs are connected to two sides of the body, and each of the tabs electrically connects to one of the batteries.

7. The battery as claimed in claim 6, wherein the multiple tabs are symmetrically connected to the two sides of the body.

8. The battery as claimed in claim 7, wherein the conductive plate has an arch that extends from a tab on one side of the body to a tab on the other side of the body.

9. The battery as claimed in claim 1, wherein the battery is further held by a case and a cover is attached to the case, wherein multiple through holes are defined in walls of the case.

10. The battery as claimed in claim 1, wherein two of the multiple conductive plates electrically connecting to the cells are used as the current collectors to conduct current generated by the battery, wherein each of the two current collectors has a platform on which terminals are formed.

11. The battery as claimed in claim 1, wherein a radius of each cell is in the range of 0.5 to 3.5 centimeters, and the battery comprises more than four cell strings, each of the cell strings comprises more than four cells connected in series.

12. The battery as claimed in claim 1, wherein each of the multiple cells is a rechargeable electrochemical cell.

13. The battery as claimed in claim 12, wherein the rechargeable cells are lithium ion cells.

14. The battery as claimed in claim 12, wherein the rechargeable cells are Ni-MH batteries.

15. The battery as claimed in claim 12, wherein the rechargeable cells are fuel cells.

16. A battery assembly comprising multiple batteries electrically connected together, wherein each battery includes:
    current collectors connecting multiple cell strings in parallel, wherein each cell string comprises multiple cells connected in series; and
    multiple conductors electrically connected among the cell strings to form a network configuration such that a cell in one cell string is connected in parallel with a cell in other cell strings, and further equalizing voltages of the multiple cells when any cell becomes different from the rest of the cells;
    wherein each of the multiple conductors is a conductive plate formed by multiple tabs being connected to a body, and each of the tabs is a flat piece having a U-shaped slot and a notch communicating with the slot defined therein, thus splitting the flat piece into three contacts.

17. The battery assembly as claimed in claim 16, wherein the batteries are connected in series to form multiple battery strings and the battery strings are further connected in parallel.

18. The battery assembly as claimed in claim 16, wherein the batteries are connected in series.

19. The battery assembly as claimed in claim 16, wherein the batteries are connected in parallel to form multiple battery strings, and the battery strings are further connected in series.

* * * * *